(12) United States Patent
Mai

(10) Patent No.: US 10,616,524 B2
(45) Date of Patent: Apr. 7, 2020

(54) SYSTEM AND METHOD FOR DISPLAYING KEY FUNCTION ICONS ON SCREEN

(71) Applicant: GUANGZHOU SHIYUAN ELECTRONICS CO., LTD., Guangzhou (CN)

(72) Inventor: Zengrong Mai, Guangzhou (CN)

(73) Assignee: GUANGZHOU SHIYUAN ELECTRONICS CO., LTD., Guangzhou (CN)

(*) Notice: Subject to any disclaimer, the term of this patent is extended or adjusted under 35 U.S.C. 154(b) by 0 days.

(21) Appl. No.: 16/301,694

(22) PCT Filed: Dec. 29, 2016

(86) PCT No.: PCT/CN2016/113122
§ 371 (c)(1),
(2) Date: Nov. 14, 2018

(87) PCT Pub. No.: WO2017/197892
PCT Pub. Date: Nov. 23, 2017

(65) Prior Publication Data
US 2019/0289244 A1 Sep. 19, 2019

(30) Foreign Application Priority Data

May 19, 2016 (CN) .......................... 2016 1 0341296

(51) Int. Cl.
H04N 5/44 (2011.01)
G06F 3/0481 (2013.01)
(Continued)

(52) U.S. Cl.
CPC ....... H04N 5/4403 (2013.01); G06F 3/04817 (2013.01); G06F 3/04845 (2013.01);
(Continued)

(58) Field of Classification Search
CPC .............. H04N 5/4403; H04N 5/44582; G06F 3/04817; G06F 3/04845
(Continued)

(56) References Cited

U.S. PATENT DOCUMENTS 9,671,828 B2 * 6/2017 Lee ........................ G06F 1/1652
9,846,505 B2 * 12/2017 Ficner ................... G06F 3/0416
(Continued)

FOREIGN PATENT DOCUMENTS

CN 1917580 A 2/2007
CN 103440086 A 12/2013
(Continued)

OTHER PUBLICATIONS

European Application No. 16902271.2, European Office Action dated Feb. 27, 2019.
(Continued)

Primary Examiner — Jefferey F Harold
Assistant Examiner — Mustafizur Rahman
(74) Attorney, Agent, or Firm — Zhong Law, LLC

(57) ABSTRACT

Provided are a screen display method and system for key function icons. The method acquires a size of a screen display area of a device, and acquires preset key function icons corresponding to physical keys of the device and a display mode of the preset key function icons, determines, according to the size and the display mode, display positions of the key function icons on the screen of the device, monitors triggering states of the physical keys of the device, if a physical key of the device is triggered, displays the key function icons at the display positions, thereby improving the accuracy in operating the physical keys of the device.

13 Claims, 3 Drawing Sheets

(51) Int. Cl.
*G06F 3/0484* (2013.01)
*H04N 5/445* (2011.01)
*H04N 21/422* (2011.01)
*H04N 21/485* (2011.01)

(52) U.S. Cl.
CPC ....... *H04N 5/44582* (2013.01); *H04N 21/422* (2013.01); *H04N 21/485* (2013.01); *H04N 2005/4408* (2013.01); *H04N 2005/44586* (2013.01)

(58) Field of Classification Search
USPC ............... 348/569, 706, 719, 725, 734, 739; 715/689, 707, 758, 773, 810
See application file for complete search history.

(56) References Cited

U.S. PATENT DOCUMENTS

| | | | | |
|---|---|---|---|---|
| 10,416,883 | B2* | 9/2019 | Kim | G06F 3/0416 |
| 2007/0028186 | A1 | 2/2007 | Park et al. | |
| 2010/0064212 | A1* | 3/2010 | Snyder | G06F 1/1626 |
| | | | | 715/700 |
| 2010/0066698 | A1* | 3/2010 | Seo | G06F 3/04883 |
| | | | | 345/173 |
| 2010/0302059 | A1* | 12/2010 | Hnatiuk | G06F 3/04817 |
| | | | | 340/12.54 |
| 2012/0290965 | A1* | 11/2012 | Ignor | G06F 3/0482 |
| | | | | 715/777 |
| 2013/0188055 | A1* | 7/2013 | Gazdzinski | G06Q 30/0251 |
| | | | | 348/159 |
| 2013/0241839 | A1* | 9/2013 | Walker | G06F 3/04845 |
| | | | | 345/173 |
| 2014/0009415 | A1* | 1/2014 | Nishida | G06F 3/04886 |
| | | | | 345/173 |
| 2014/0078086 | A1* | 3/2014 | Bledsoe | G06F 3/041 |
| | | | | 345/173 |
| 2014/0123013 | A1* | 5/2014 | Lee | H04M 1/72544 |
| | | | | 715/719 |
| 2014/0164976 | A1* | 6/2014 | Kim | G06F 1/1643 |
| | | | | 715/773 |
| 2014/0218309 | A1* | 8/2014 | Park | G06F 1/1626 |
| | | | | 345/173 |
| 2014/0253440 | A1* | 9/2014 | Karakotsios | G06F 1/1692 |
| | | | | 345/157 |
| 2014/0365954 | A1* | 12/2014 | Yoshizawa | G06F 3/0485 |
| | | | | 715/784 |
| 2015/0121281 | A1* | 4/2015 | Sihn | G06F 3/0481 |
| | | | | 715/772 |
| 2015/0331551 | A1* | 11/2015 | Lee | G06F 3/04817 |
| | | | | 715/781 |
| 2016/0070407 | A1* | 3/2016 | Jeon | G06F 1/1626 |
| | | | | 345/173 |
| 2016/0195973 | A1* | 7/2016 | Ficner | G06F 3/0416 |
| | | | | 345/174 |
| 2016/0197637 | A1* | 7/2016 | Lee | G06F 3/14 |
| | | | | 455/566 |
| 2017/0251114 | A1* | 8/2017 | Ichiyama | H04N 1/00411 |

FOREIGN PATENT DOCUMENTS

| | | |
|---|---|---|
| CN | 103618863 A | 3/2014 |
| CN | 104461549 A | 3/2015 |
| CN | 104915089 A | 9/2015 |
| JP | 2014235506 A | 12/2014 |
| KR | 20110123903 A | 11/2011 |

OTHER PUBLICATIONS

The State Intellectual Property Office of People's Republic of China; First Office Action for Application No. 201610341296.2; 11 pages.

International Search Report and Written Opinion; PCT/CN2016/113122; dated Mar. 23, 2017; 11 pages.

Chinese Application No. 201610341296.2, Chinese Office Action dated May 17, 2019. 12 pages.

European Application No. 16902271.2, European Office Action dated Sep. 16, 2019.

* cited by examiner

SYSTEM AND METHOD FOR DISPLAYING KEY FUNCTION ICONS ON SCREEN

CROSS-REFERENCE TO RELATED APPLICATIONS

This application claims priority to International Patent Application No. PCT/CN2016/113122 filed Dec. 29, 2016, which claims priority to Chinese application No. CN 201610341296.2, filed May 19, 2016, the contents of which are hereby incorporated by reference as though fully set forth herein.

TECHNICAL FIELD

The present invention relates to the field of graphics and images, and in particular, to a system and method for displaying key function icons on a screen.

BACKGROUND

At present, televisions (TV) commonly use function keys. In addition to the most basic TV power on/off key, they usually include channel switching keys, menu keys, and up, down, left and right directional keys, etc. The purpose is to be able to operate the TV with basic functions such as TV on and off, channel switching, and menu option operation when the TV remote control is unavailable. In order to let the TV user know the function of each key, the current technology is mostly to print the function icon corresponding to the key on the TV shell, next to the position where each key is located, or on a sticker that is then pasted next to the key.

The main problem with the existing method is that the printed icon is difficult to modify. In case the icon is misplaced at a position not corresponding to the key, the user cannot operate the function key properly.

SUMMARY

To overcome the above problems in the current technologies, the present invention provides a system and method for displaying key function icons on a screen, which can improve the precision to operate physical keys of a device.

The method for displaying the key function icons on a screen according to the present invention provides the following technical solution:

acquiring a size of a screen display area of a device;

acquiring preset key function icons corresponding to physical keys of the device, and a display mode of the preset key function icons;

determining, based on the size and the display mode, display positions of the key function icons on the screen of the device; and monitoring triggering states of the physical keys of the device, and if a physical key of the device is triggered, displaying the key function icons at the display positions.

The system for displaying the key function icons on a screen according to the present invention includes:

a first acquiring module, to acquire a size of a screen display area of a device;

a second acquiring module, to acquire preset key function icons corresponding to physical keys of the device, and a display mode of the preset key function icons;

a position determining module, to determine, based on the size and the display mode, display positions of the key function icons on the screen of the device; and a monitoring display module, to monitor triggering states of the physical keys of the device, and if a physical key of the device is triggered, display the key function icons at the display positions.

The method and system for displaying key function icons on a screen according to the present invention includes acquiring a size of a screen display area of the device, and acquiring preset key function icons corresponding to physical keys of the device and a display mode of the preset key function icons, determining, based on the size and the display mode, display positions of the key function icons on the screen of the device, monitoring triggering states of the physical keys of the device, if a physical key of the device is triggered, displaying the key function icons at the display positions, thereby improving the accuracy in operating physical keys of the device.

BRIEF DESCRIPTION OF DRAWING(S)

DETAILED DESCRIPTION

In order to further clarify the objectives, technical solutions and advantages of the present invention, the present invention will be further described in detail with reference to the accompanying drawings.

Figure 1:
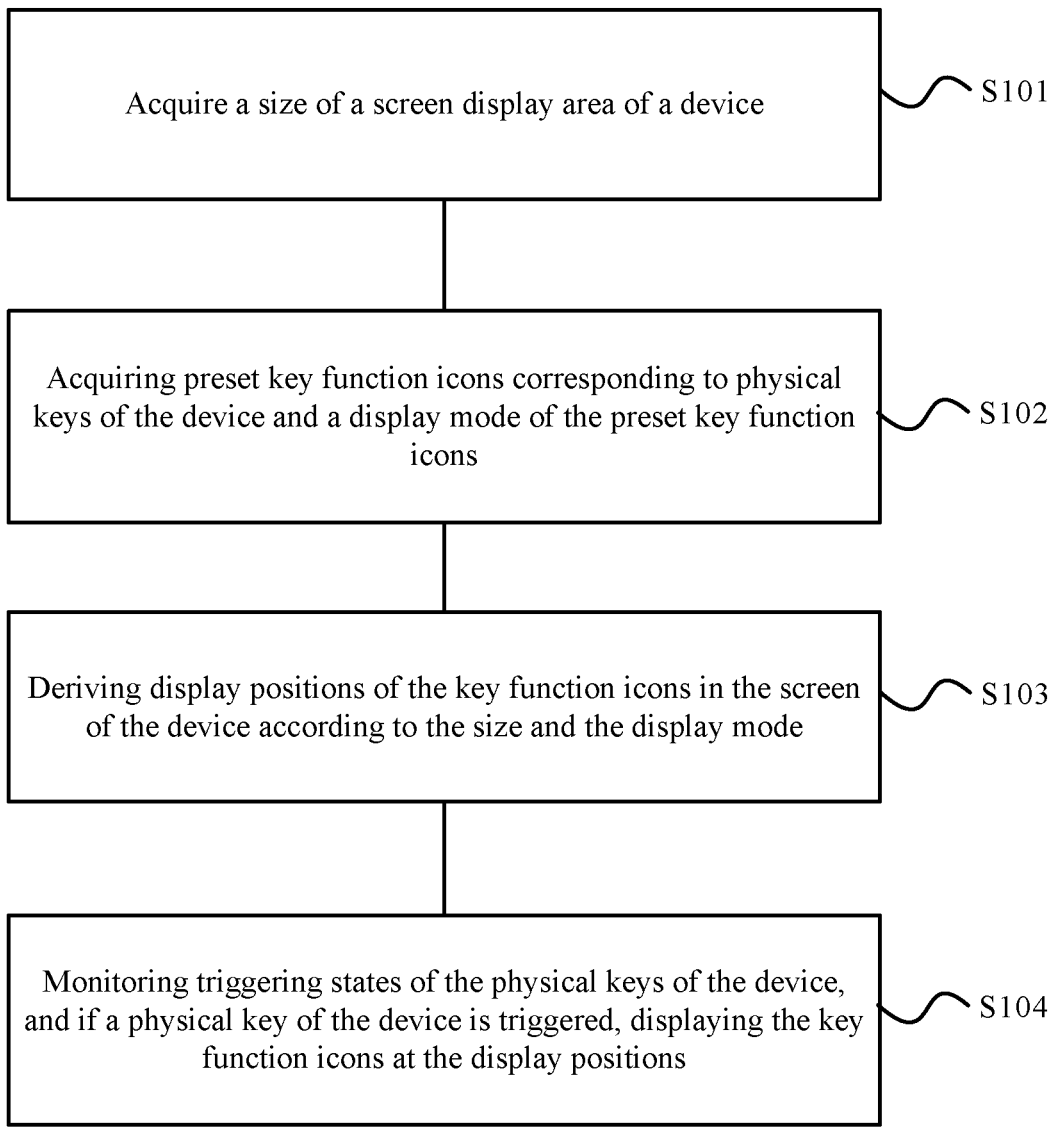
FIG. 1 is a schematic flow chart of a screen display method for key function icons according to an embodiment.

Please refer to the flow chart of a method for displaying key function icons on a screen according to an embodiment in FIG. 1, including steps S101 to S104:

S101: acquiring a size of a screen display area of a device.

In this step, the size of the screen display area can be acquired directly from the preset code of the control board of the device, or be acquired by acquiring the width and height of the screen display area and then calculating the size of the screen display area from the width and height. It is also possible to store in a database the device model and the size of the screen display area, in which the device model has a one-to-one correspondence with the size of the screen display area. The device model is acquired from the preset code of the control board of the device, and the size of the screen display area corresponding to the device model is acquired from the database.

S102: acquiring preset key function icons corresponding to physical keys of the device and a display mode of the preset key function icons.

The display mode may be a horizontally arranged display mode or a vertically arranged display mode. The specific display mode can be determined according to actual use situations or the arrangement of the physical keys of the device.

Further, after the acquiring preset key function icons corresponding to the physical keys of the device, acquire lengths and widths of the key function icons, and compare sizes of the key function icons with the size of the corresponding keypad of the physical keys of the device. If the sizes of the key function icons do not match the size of the corresponding keypad, adjusting the lengths and widths of the key function icons, so that the sizes of the key function icons are matched with the size of the corresponding keypad, thus realizing the spatial match between the key function icons and the physical keys of the device, further improving the accuracy in operating the physical keys of the device.

Specifically, the icons to be used and the order in which they are to be arranged may be pre-defined in the preset code of the control board of the device. The software automatically acquires the lengths and widths of the icons to calculate the display space required for the entire icon set. If the size of the display space of the icons does not match the size of the physical keypad of the device, the lengths and widths of the icons may be defined to adjust the display space of the icons, so as to achieve the match between the space occupied by the icons and the physical keys of the device.

S103: determining, based on the size and the display mode, display positions of the key function icons in the screen of the device.

Further, determining, according to the size and a position of a first physical key of the device, a display position of a first key function icon on the screen of the device as a starting position; determining, according to the display mode and the starting position, display positions of the remaining key function icon other than the first key function icon as remaining positions on the screen of the device; and deriving display positions of the key function icons on the screen of the device according to the starting position and the remaining positions.

In this embodiment, the key function icons includes an enter key function icon, a menu key function icon, a volume up key function icon, a volume down key function icon, a channel+ key function icon, a channel− key function icon, and a power key function icon. If the enter key function icon is used as the first key function icon among the key function icons, the remaining menu key function icon, volume up key function icon, volume down key function icon, channel+ key function icon, channel− key function icon, and power key function icon are used as the remaining key function icons other than the first key function icon. This step is to determine the display position of the first key function icon on the screen of the device as the starting position. Then, according to the starting position, the display positions of the remaining key function icons in the screen of the device are determined, thereby improving the convenience of setting the key function icons.

Further, before the determining, according to the size and the position of the first physical key of the device, the display position of the first key function icon on the screen of the device, establishing a plane coordinate system in the screen display area by taking an upper left corner of the screen display area of the device as an origin, a horizontal line passing through the origin as an horizontal axis, and a vertical line passing through the origin as a vertical axis; then, determining, according to the position of the first physical key of the device, the coordinate of the first key function icon in the plane coordinate system as a starting coordinate position; determining, according to the display mode and the starting coordinate position, coordinates of the remaining key function icons in the plane coordinate system as the remaining coordinate positions; determining, according to the starting coordinate position and the remaining coordinate positions, the display position of the key function icons in the screen of the device. These steps determine the starting coordinate position of the first key function icon in the screen of the device by establishing the plane coordinate system in the screen display area, and then determines other coordinate positions of the remaining key function icons on the screen of the device according to the starting coordinate position, thereby improving the accuracy of the key function icon settings.

S104: monitoring triggering states of the physical keys of the device, and if a physical key of the device is triggered, displaying the key function icons at the display positions.

In this step, the physical key of the device may be triggered by the user directly pressing the physical key of the device. This step improves the accuracy in operating the physical keys of the device.

Further, in the step of displaying the key function icons at the display positions, the key function icon corresponding to the position of the triggered physical key of the device is differentially displayed. Through this step, the user directly learns which physical key of the device is triggered, so as to accurately operate the physical keys of the device, thereby further improving the accuracy in operating the physical keys of the device and improving user experience.

Further, after the displaying the key function icons at the display positions, if there is no detection that the physical keys of the device have been triggered again within a predetermined time period, automatically hiding the key function icons to avoid interfering with the operation of the device by the user, thereby further improving user experience.

In an embodiment, the method of displaying the key function icons on a screen includes acquiring a size of a screen display area of the device, acquiring preset key function icons corresponding to physical keys of the device, and a display mode of the preset key function icons, determining, according to the size and the display mode, display positions of the key function icons in the screen of the device, and monitoring triggering states of the physical keys of the device, if a physical key of the device is triggered, displaying the key function icons at the display positions, thereby improving the accuracy in operating the physical keys of the device.

Figure 2:
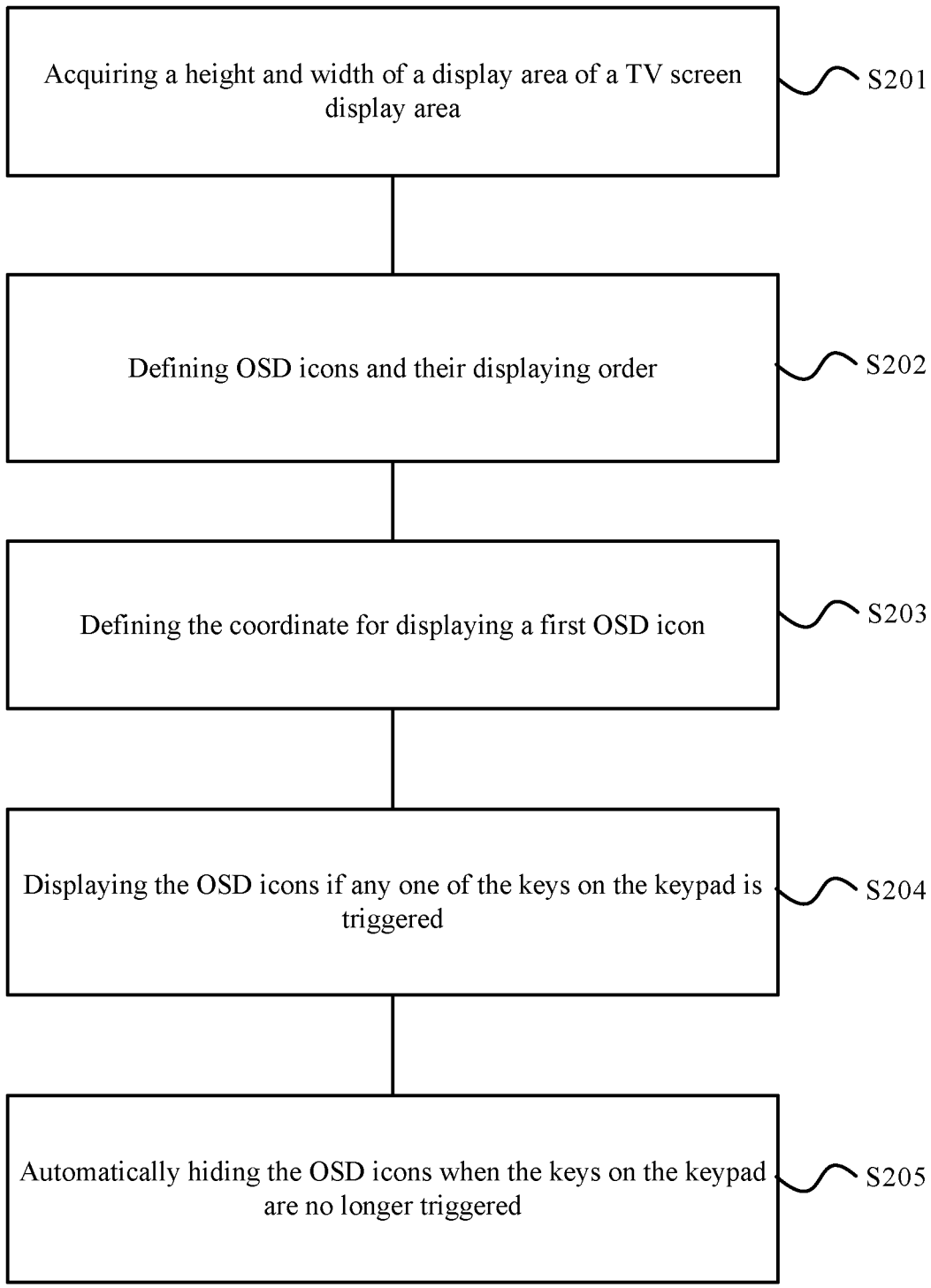
FIG. 2 is a schematic flow chart of a screen display method for key function icons according to a preferred embodiment.

The following is a preferred embodiment of the method for displaying key function icons on a screen. In this embodiment, references are made by taking a screen display of television key function icons as an example. As shown in FIG. 2, step S201 to step S205 are included:

S201: acquiring a height and width of a display area of a TV screen display area. Defining the width and height of the screen in the software code of the TV main board, or defining the model number of the screen in the software code of the TV main board, where the software acquires the width and height of the screen from the preset database according to the model of the screen. Specifically, for a new LCD TV screen, the height and width of the screen are acquired firstly through the specification of the screen, and the height and width of the screen are fed into the code of the LCD TV control board. For an older model LCD screen, simply input the model number of the screen into the code and the code will automatically find the height and width of the screen in the database.

S202: defining OSD (On Screen Display) icons and their displaying order. In the software code of the TV main board, the icons to be used and the order in which they are to be arranged are pre-defined, and the software automatically acquires the lengths and widths of the icons to calculate the display space required for the entire set of icons. If the area of the display space of the icons does not match the size of the area where the keypad is located, the display space of the icons can be adjusted by defining the lengths and widths of the icons, so as to match the space occupied by the icons and the operation keys.

Specifically, icons that can indicate functions of these keys are selected according to the keys on the keypad required for the design of the television. For example, a TV may require seven keys, e.g., "Enter", "Menu", "V+", "V−", "CH+", "CH−" and "Power", and the keys are arranged in the same order as they are laid out above, and the selected indicating icons and their arrangement are shown in Table 1:

TABLE 1

OSD indicating icon pattern selection and horizontal sorting table

| Enter | Menu | V+ | V− | CH+ | CH− | Power |
|-------|------|----|----|-----|-----|-------|

The selected indicating icons can also be arranged vertically, as shown in Table 2 below:

| |
|---|
| Enter |
| Menu |
| V+ |
| V− |
| CH+ |
| CH− |
| Power |

S203: defining the coordinate for displaying a first OSD icon. According to the positions of the operation keys on the TV case, defining the starting coordinate of the first OSD icon in the software code of the TV main board. Based on the coordinate of the first OSD icon, the software calculates the positions of all subsequent OSD icons to form a set of ordered OSD icon display.

The plane coordinate system is established by taking an upper left corner of the TV as an origin, the X coordinate axis runs through the origin horizontally to the right, and the Y coordinate axis runs through the origin vertically downward. In this coordinate system, the first OSD icon is defined at the coordinate of the upper left corner. After defining the first OSD icon at the coordinate of the upper left corner, the software automatically calculates the coordinates of other icons to form an ordered OSD icon display.

S204: displaying the OSD icons if any one of the keys on the keypad is triggered. In the default state of the TV, the OSD icons are not displayed on the TV screen. When the user presses a key on the TV keypad, an entire set of OSD icons will be displayed on the TV screen, and each key icon will be aligned with the corresponding function key. The icon corresponding to the depressed key will be highlighted to let the user know which key is being depressed. According to the entire set of OSD icons on the screen, the user can accurately control the TV using the keys.

S205: automatically hiding the OSD icons when the keys on the keypad are no longer triggered. After the user stops operating the TV keypad for a few seconds, the TV automatically hides the OSD icons on the screen, and the TV screen returns to the normal state, so that the OSD icons do not interfere the user from watching the TV.

In this implementation, instead of conventional printed icons or posted icons on the TV casing, the key function icons are displayed on the TV screen at positions corresponding to the operation keys, thereby improving the accuracy in operating the physical keys of the television. In addition, the method for displaying the key function icons on the screen according to the present embodiment can also save the cost associated with icon printing or the icon sticker. Moreover, by using the key function icons displayed as the OSD, it is convenient to modify the positions, order, and pattern of the icons, avoiding material cost for remaking the icons.

Figure 3:
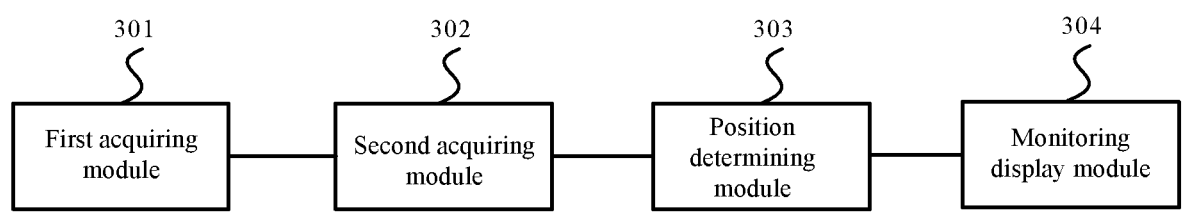
FIG. 3 is a schematic structural diagram of a screen display system for key function icons according to an embodiment.

The invention also provides a system for displaying key function icons on a screen, including, as shown in FIG. 3, a first acquiring module 301, a second acquiring module 302, a position determining module 303, and a monitoring display module 304.

The first acquiring module 301 is to acquire a size of a screen display area of a device; the second acquiring module 302 is to acquire preset key function icons corresponding to physical keys of the device, and a display mode of the preset key function icons; the position determining module 303 is to acquire, according to the size and the display mode, display positions of the key function icons on the screen of the device; the monitoring display module 304 is to monitor triggering states of the physical keys of the device, if a physical key of the device is triggered, displaying the key function icons at the display positions.

In an embodiment, the system for displaying the key function icons on the screen may perform acquiring a size of a screen display area of the device, acquiring preset key function icons corresponding to physical keys of the device and a display mode of the preset key function icons, deriving, according to the size and the display mode, display positions of the key function icons on the screen of the device, and monitoring the triggering state of the physical keys of the device, if physical keys of the device is triggered, displaying the key function icons at the display positions, thereby improving the accuracy in operating physical keys of the device.

In one of the embodiments, the second acquiring module 302 includes a comparing submodule and a matching submodule. The comparing submodule is to acquire lengths and widths of the key function icons, and compare sizes of the key function icons with a size of a corresponding key of the physical keys of the device. The matching submodule is to adjust lengths and widths of the key function icons if the sizes of the key function icons do not match the size of the corresponding keypad, so that the sizes of the key function icons may fit the size of the corresponding keypad, thus realizing spatial match between the key function icons and the physical keys of the device, thereby improving the accuracy in operating physical keys of the device.

In one of the embodiments, the position determining module 303 includes a first position determining submodule, a second position determining submodule, and a third position determining submodule. The first position determining submodule is to determine, according to the size and location of a first physical key of the device, a display position of the first key function icon on the screen of the device as a starting position. The second position determining submodule is to determine, according to the display mode and the starting position, display positions of remaining key function icons other than the first key function icon as remaining positions on the screen of the device. The third position determining submodule is to acquire display positions of the key function icons on the screen of the device according to the starting position and the remaining positions. This embodiment may determine the display position of the first key function icon on the screen of the device as the starting position, and then determines, according to the starting position, display positions of the remaining key function icons on the screen of the device, thereby improving the convenience in setting the key function icons.

In one of the embodiments, the monitoring display module 304 includes a differentially displaying submodule and a hiding submodule. The differentially displaying submodule is to display the key function icons at the display positions, where the key function icon corresponding to the triggered physical key of the device is displayed differentially, allowing the user to directly learn which physical key of the device is being triggered, and to accurately operate the physical keys of the device, thereby further improving the accuracy in operating physical keys of the device and improving the user experience. The hiding submodule is to, after the key function icons are displayed at the display positions, automatically hide the key function icons if there is no detection that the physical keys of the device have been triggered again within a predetermined time period, so as to avoid interfering the operation of the device by the user, thereby further improving the user experience.

The technical features of the above-described embodiments may be re-combined in any manner. For the sake of brevity in description, all possible combinations of the technical features in the above embodiments are not described. However, as long as there is no contradiction between the technical features in a combination, the combination should be considered as within the scope of this specification.

The above-mentioned embodiments are merely illustrative of some of the embodiments of the present invention, and the description thereof is more specific and detailed, but is not to be construed as limiting the scope of the invention. It should be noted that various variations and modifications may be made by those skilled in the art without departing from the spirit and scope of the invention. Therefore, the scope of the invention should be determined by the appended claims.

What is claimed is:

1. A method for displaying key function icons on a screen, comprising:
    acquiring a size of a screen display area of a device;
    acquiring one or more preset key function icons corresponding to one or more physical keys of the device, and a display mode of the one or more preset key function icons;
    determining, according to the size of the screen display area and the display mode, one or more display positions of the one or more key function icons on the screen display area of the device;
    monitoring triggering states of the one or more physical keys of the device; and
    responsive to detecting that a physical key of the device is triggered, displaying the one or more key function icons at the one or more display positions, wherein the key function icon corresponding to the triggered physical key of the device is displayed differentially.

2. The method for displaying the key function icons on the screen according to claim 1, further comprising:
    acquiring lengths and widths of the one or more key function icons, and comparing sizes of the one or more key function icons with a size of a corresponding keypad of the one or more physical keys of the device; and
    if the sizes of the one or more key function icons do not match with the size of the corresponding keypad, adjusting the lengths and the widths of the one or more key function icons to match the sizes of the one or more key function icons with the size of the corresponding keypad.

3. The method for displaying the key function icons on the screen according to claim 1, wherein the determining, according to the size and the display mode comprises, the one or more display positions of the one or more key function icons on the screen display area of the device:
    determining, according to the size and a position of a first physical key of the device, a display position of a first key function icon on the screen display area of the device as a starting position;
    determining, according to the display mode and the starting position, remaining display positions of the remaining key function icons other than the first key function icon on the screen display area of the device as the remaining display positions; and
    determining, according to the starting position and the remaining display positions, the one or more display positions of the one or more key function icons on the screen display area of the device.

4. The method for displaying the key function icons on the screen according to claim 3, wherein before the determining, according to the size and the position of the first physical key of the device, the display position of the first key function icon on the screen display area of the device as the starting position, the method comprises:
    establishing a plane coordinate system on the screen display area by taking an upper left corner of the screen display area of the device as an origin, a horizontal line passing through the origin as a horizontal axis, and a vertical line passing through the origin as a vertical axis;
    wherein the determining, according to the size and the position of the first physical key of the device, the display position of the first key function icon on the screen display area of the device as the starting position comprises:
    determining, according to the position of the first physical key of the device, a coordinate of the first key function icon in the plane coordinate system as a starting coordinate position;
    wherein the determining, according to the display mode and the starting position, remaining display positions of the remaining key function icons other than the first key function icon on the screen display area of the device as the remaining positions comprises:
    determining, according to the display mode and the starting coordinate position, coordinates of the remaining key function icons in the plane coordinate system as the remaining coordinate positions; and
    wherein the determining, according to the starting position and the remaining positions, the one or more display positions of the one or more key function icons on the screen display area of the device comprises:
    determining, according to the starting coordinate position and the remaining coordinate positions, the one or more display positions of the one or more key function icons on the screen display area of the device.

5. The method for displaying the key function icons on the screen according to claim 1, wherein after the displaying the one or more key function icons in the one or more display positions, the method comprises:
    hiding the one or more key function icons if there is no detection that any of the one or more physical keys of the device have been triggered again within a predetermined time period.

6. A method for displaying key function icons on a screen the method comprising:
    acquiring a size of a screen display area of a device;

acquiring one or more preset key function icons corresponding to one or more physical keys of the device, and a display mode of the one or more preset key function icons;

responsive to acquiring the one or more preset key function icons corresponding to the one or more physical keys of the device, acquiring lengths and widths of the one or more key function icons, and comparing sizes of the one or more key function icons with a size of a corresponding keypad of the one or more physical keys of the device; and if the sizes of the one or more key function icons do not match with the size of the corresponding keypad, adjusting the lengths and the widths of the one or more key function icons to match the sizes of the one or more key function icons with the size of the corresponding keypad;

determining, according to the size of the screen display area and the display mode, one or more display positions of the one or more key function icons on the screen display area of the device;

monitoring triggering states of the one or more physical keys of the device; and responsive to detecting that a physical key of the device is triggered, displaying the one or more key function icons at the one or more display positions.

7. The method for displaying the key function icons on the screen according to claim 6, wherein the determining, according to the size and the display mode comprises, the one or more display positions of the one or more key function icons on the screen display area of the device:

determining, according to the size and a position of a first physical key of the device, a display position of a first key function icon on the screen display area of the device as a starting position;

determining, according to the display mode and the starting position, remaining display positions of the remaining key function icons other than the first key function icon on the screen display area of the device as the remaining display positions; and determining, according to the starting position and the remaining display positions, the one or more display positions of the one or more key function icons on the screen of the device.

8. The method for displaying the key function icons on the screen according to claim 7, wherein before the determining, according to the size and the position of the first physical key of the device, the display position of the first key function icon on the screen display area of the device as the starting position, the method comprises:

establishing a plane coordinate system in the screen display area by taking an upper left corner of the screen display area of the device as an origin, a horizontal line passing through the origin as a horizontal axis, and a vertical line passing through the origin as a vertical axis;

wherein the determining, according to the size and the position of the first physical key of the device, the display position of the first key function icon on the screen display area of the device as the starting position comprises:

determining, according to the position of the first physical key of the device, a coordinate of the first key function icon in the plane coordinate system as a starting coordinate position;

wherein the determining, according to the display mode and the starting position, remaining display positions of the remaining key function icons other than the first key function icon in the screen display area of the device as the remaining positions comprises:

determining, according to the display mode and the starting coordinate position, coordinates of the remaining key function icons in the plane coordinate system as the remaining coordinate positions; and wherein the determining, according to the starting position and the remaining positions, the one or more display positions of the one or more key function icons on the screen display area of the device comprises:

determining, according to the starting coordinate position and the remaining coordinate positions, the one or more display positions of the one or more key function icons on the screen display area of the device.

9. The method for displaying the one or more key function icons on the screen according to claim 6, wherein the displaying the key function icons at the display positions comprises:

displaying the one or more key function icons at the one or more display positions, wherein the key function icon corresponding to the triggered physical key of the device is displayed differentially.

10. The method for displaying the key function icons on the screen according to claim 6, wherein after the displaying the one or more key function icons in the one or more display positions, the method comprises:

hiding the one or more key function icons if there is no detection that any of the one or more physical keys of the device have been triggered again within a predetermined time period.

11. A system for displaying key function icons on a screen, comprising:

a screen; and a device comprising a control board to:

acquire a size of a screen display area of the screen associated with the device;

acquire one or more preset key function icons corresponding to one or more physical keys of the device, and a display mode of the one or more preset key function icons;

responsive to acquiring the one or more preset key function icons corresponding to the one or more physical keys of the device, acquire lengths and widths of the one or more key function icons to compare sizes of the one or more key function icons with a size of a corresponding keypad of the one or more physical keys of the device; and adjust the lengths and the widths of the one or more key function icons to match the sizes of the one or more key function icons with the size of the corresponding keypad if the sizes of the one or more key function icons do not match with the size of the corresponding keypad;

determine, according to the size and the display mode, one or more display positions of the one or more key function icons on the screen display area of the device;

monitor triggering states of the one or more physical keys of the device, and responsive to detecting that a physical key of the device is triggered, cause to display the one or more key function icons at the one or more display positions.

12. The system for displaying the key function icons on a screen according to claim 11, wherein the control board is further to:
- determine, according to the size and a position of a first physical key of the device, a display position of a first key function icon on the screen display area of the device as a starting position;
- determine, according to the display mode and the starting position, remaining display positions of the remaining key function icons other than the first key function icon on the screen display area of the device as remaining display positions; and
- determine the one or more display positions of the one or more key function icons on the screen display area of the device according to the starting position and the remaining display positions.

13. The system for displaying the key function icons on the screen according to claim 11, wherein the control board is further to:
- cause to display the one or more key function icons at the one or more display positions, wherein the key function icon corresponding to the triggered physical key of the device is displayed differentially; and
- hide the one or more key function icons if there is no detection that any of the one or more physical keys of the device have been triggered again within a predetermined time period after the displaying the one or more key function icons at the display positions.

\* \* \* \* \*